UNITED STATES PATENT OFFICE.

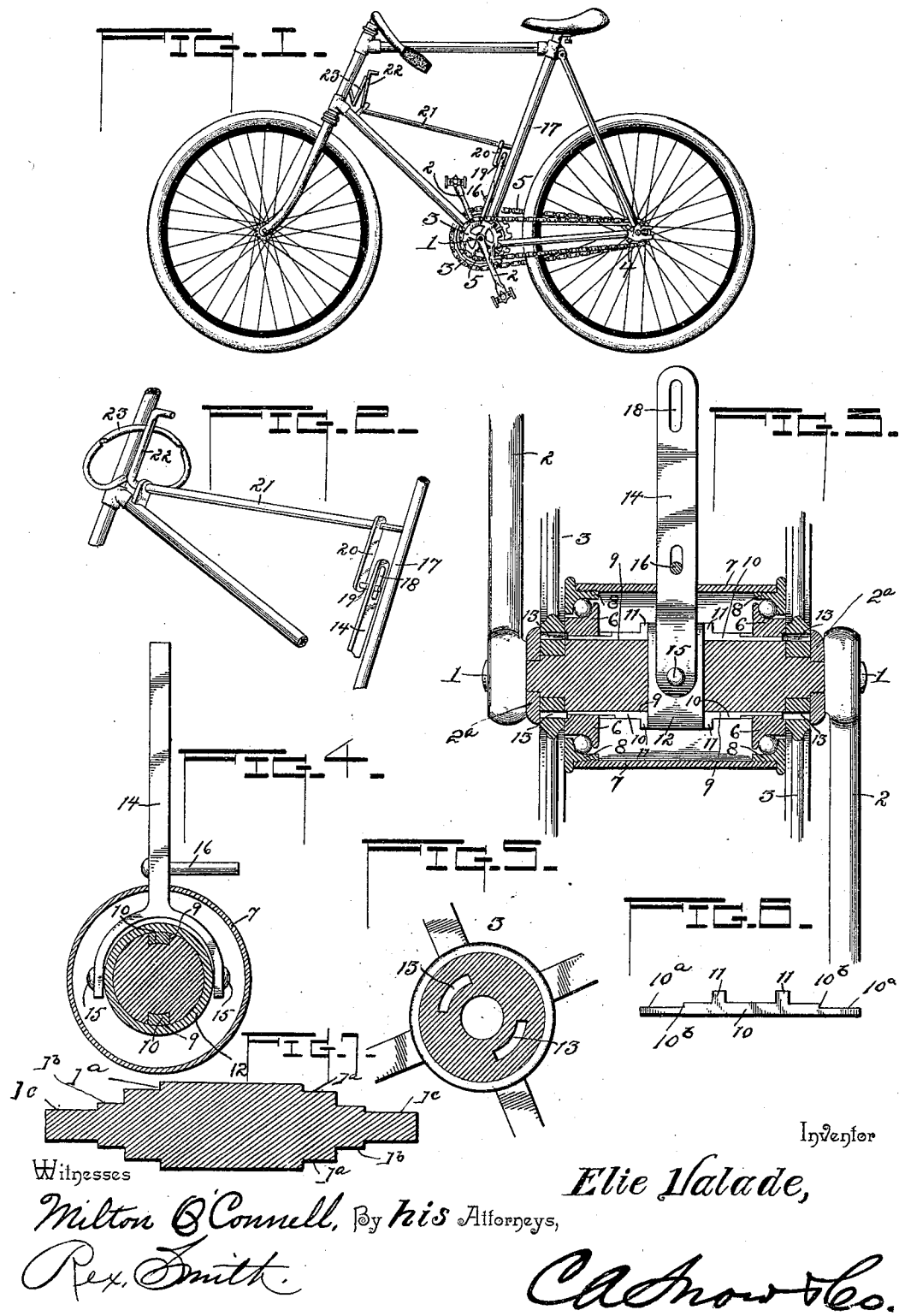

ELIE VALADE, OF JACKSONVILLE, FLORIDA.

CHANGEABLE-SPEED GEARING FOR BICYCLES.

SPECIFICATION forming part of Letters Patent No. 635,823, dated October 31, 1899.

Application filed March 18, 1896. Serial No. 583,761. (No model.)

*To all whom it may concern:*

Be it known that I, ELIE VALADE, a citizen of the United States, residing at Jacksonville, in the county of Duval and State of Florida, have invented a new and useful Changeable-Speed Gearing for Bicycles, of which the following is a specification.

My invention relates to bicycles, and particularly to changeable-speed gearing, by means of which the driving mechanism may be adjusted either for power or speed, according to the requirements or conditions of the road traversed by the vehicle.

The objects in view are, primarily, to provide a simple, compact, and efficient construction and arrangement of parts designed for varying the driving mechanism, as above indicated; furthermore, to provide simple means, in connection with the mechanism, for taking up lost motion due to wear without affecting the clutch devices, and, furthermore, to provide means for excluding dust from the shifting mechanism.

A further object of the invention is to provide simple, efficient, and direct means, readily accessible to the rider, for communicating motion to the clutch mechanism and for locking the parts at the desired adjustment, whereby the adjustment may be accomplished while the vehicle is in motion and without requiring the rider to change his position.

Further objects and advantages of this invention will appear in the following description, and the novel features thereof will be particularly pointed out in the appended claims.

In the drawings, Figure 1 is a side view of a bicycle provided with driving mechanism constructed in accordance with my invention. Fig. 2 is a detail view in perspective of the shifting devices. Fig. 3 is a longitudinal section of the crank-hanger and driving mechanism. Fig. 4 is a transverse section of the crank-hanger and crank-axle, taken in the plane of the sliding collar. Fig. 5 is a transverse section taken contiguous to the plane and showing the inner face of one of the sprocket-wheel hubs. Fig. 6 is a detail view of one of the clutch keys or feathers. Fig. 7 is a longitudinal sectional view of the crank-axle.

Similar numerals of reference indicate corresponding parts in all the figures of the drawings.

The crank-axle 1 is provided with a central enlarged body portion and a series of annular seats of successively-reduced diameters, abrupt shoulders being arranged between each two contiguous seats. In the construction illustrated the innermost annular seats $1^a$, which are of slightly less diameter than the enlarged or central body portion of the axle, are adapted to receive the inner or stationary ball-cones 6, with which coöperate adjustable ball-cones 8 of larger diameter than the cones 6 to form seats for the usual antifriction-balls. The adjustable cones 8 are threaded in the extremities of a cylindrical open-ended crank-hanger 7 of sufficiently larger diameter than the central or body portion of the crank-axle to accommodate the coöperating fixed and adjustable cones, and this crank-hanger is also designed to form a dust-guard, by which the clutch mechanism hereinafter described is inclosed. The adjustable cones are threaded in the extremities of the crank-hanger to provide for adjustment to take up wear in the ball-races. Obviously the fixed cones 6 bear against the shoulders at the inner ends of the reduced portions forming the seats $1^a$, whereby inward displacement of the cones 6 is prevented, and as the pressure and adjustment of the adjustable cones 8 are inward it is obvious that the same combination of parts holds the crank-axle from axial displacement.

Outside of or beyond the seats $1^a$ the crank-axle is further reduced to form sprocket-wheel journals $1^b$, which are separated from the seats $1^a$, which I will hereinafter designate as "fixed-cone" seats, by an interposed abrupt shoulder which prevents inward displacement of the sprocket-wheels 3, which are mounted thereon, said sprocket-wheels being of different diameters, as in the ordinary construction of devices of this class. Obviously the sprocket-wheels are loosely mounted upon the journal portions $1^b$ for rotation independently thereof, and they are held from outward displacement by means of washers $2^a$, which are fitted upon still further reduced terminal seats $1^c$ at the extremities of the crank-axle, said washers bearing against abrupt shoulders which are interposed between the terminal seats 1ᶜ and the sprocket-wheel journals 1ᵇ. The cranks 2 are fixed, as by keys or similar devices well known in the art, upon said terminal seats 1ᶜ and hold the washers 2ᵃ in their operative positions.

The hubs of the sprocket-wheels are provided, preferably at diametrically opposite points, with segmental or arc-shaped key-slots 13, which, however, are arranged at a less distance from the axis of the crank-axle than the radius of the washers 2ᵃ, whereby the outer ends of said key-slots are closed by the washers to exclude dust.

Formed in the surface of the crank-axle at diametrically opposite points are longitudinal key-seats 9, of which the floors or innermost sides are arranged between the seats 1ᵃ and 1ᵇ, and the keys 10, which are fitted to slide in said seats, are terminally constructed to fit in the key-slots 13 in the hubs of the sprocket-wheels. The length of the keys is less than the interval between the inner or contiguous faces of the sprocket-wheel hubs, whereby when said keys occupy an intermediate position they are out of engagement with the sprocket-wheels to leave the latter free for independent rotation; but when the keys are adjusted in either direction to the limit of their movement their reduced extremities 10ᵃ engage the slots of one of the sprocket-wheels to lock the latter in a fixed position upon the crank-axle, and thus provide for the communication of motion through one of the chains 5 to a rear sprocket-pinion 4 on the driving-wheel axle.

As above indicated, the key-seats are arranged with their floors between the reduced seats 1ᵃ and journals 1ᵇ of the crank-axle, and in order that the terminal portions of the keys may operate in the corresponding portions of the key-seats without projecting radially beyond the seats 1ᵃ said terminal portions are reduced, as shown at 10ᵃ, thus forming shoulders 10ᵇ, which when the keys are moved in one direction or the other come in contact with the inner sides of the ball-cones 6, and thus limit the adjustment of the keys in that direction. Furthermore, the keys are of a width less than the lengths of the sockets or slots 13 in the sprocket-wheel hubs to facilitate the engagement of the keys with said sockets or slots when pressure is exerted upon the keys to hold their extremities in contact with the inner surface of one of the sprocket-wheel hubs. By this construction the engagement of the keys with either sprocket-wheel may be accomplished during the motion of the vehicle.

The keys are provided at intermediate points and projecting beyond the surface of the enlarged or central portion of the crank-axle with spaced lugs 11, between which is seated a shifting collar 12, and the yoke or fork of the shifting lever 14 straddles the collar and has its arms pivotally connected thereto at diametrically opposite points by means of pins or screws 15. The shifting lever 14 is mounted, by means of a pin 16, on the frame of the vehicle, such as the seat-post 17, outside of the crank-hanger or dust-sleeve 7, but contiguous to the surface thereof, whereby the slot in said crank-hanger, through which the shifting lever extends, need be but slightly longer than the width of the lever. Furthermore, the lever is provided with an elongated opening or slot for engagement with the fulcrum-pin 16 to allow for a slight longitudinal movement of the lever in operation without cramping the parts. The keys 10 are held in their seats by the cones 6 and the band 12, the latter engaging them centrally and the cones embracing their terminal portions.

The shifting lever 14 is arranged to operate parallel with the seat-post 17, and it extends upward to a point approximately midway between the upper and lower front tubes or braces of the bicycle-frame, where it has connection, by means of a crank 20, with a rock-shaft 21. This rock-shaft is mounted at its extremities in suitable bearings on the bicycle-frame and extends from the seat-post forwardly in an approximately horizontal position to a point contiguous to the steering-head, where it is provided with a preferably integral upwardly-extending operating-arm 22, arranged to traverse a notched segment 23, which is rigidly fixed to the frame of the vehicle in a transverse position and is preferably provided with a central and two side notches, either of which is adapted to receive the operating-handle. The crank 20 is provided at its extremity with a rearwardly-extending pin 19 to operate in a longitudinal slot 18 near the upper end of the shifting lever 14, and owing to the fact that the operating-lever 22 extends upwardly, while the crank 20 extends downwardly from the rock-shaft, the shifting lever 14 being fulcrumed at an intermediate point, it is obvious that the clutch-keys 10 will be moved in the same direction as the operating-lever 22, whereby when the rider desires to utilize one or the other of the sprocket-wheels 3 he moves the operating-lever toward that side of the frame of the vehicle at which the preferred sprocket-wheel is arranged. This avoids confusion in the mind of the rider as to the proper direction in which to move the operating-lever in order to accomplish the locking of the selected sprocket-wheel. The notched segment 23, which is preferably attached to the head of the vehicle, is also preferably constructed of spring-metal, and hence when pressure is applied to the operating-lever to move it from one of its adjusted positions to another said rack will yield sufficiently to release the lever and will again spring backward to reëngage the lever when the latter reaches a position in alinement with one of its notches. Thus the manipulation of locking devices to secure the clutch mechanism at the desired adjustment is avoided. The locking of the operating-lever is accomplished automatically and is firmly held from further displacement or change of adjustment by the jarring of the vehicle. Furthermore, it will be seen that the operating-lever by being located contiguous to the head of the vehicle is within convenient reach of the hand of the rider without necessitating any material change of position upon the part of the rider.

Various changes in the form, proportion, and the minor details of construction may be resorted to without departing from the spirit or sacrificing any of the advantages of this invention.

Having described my invention, what I claim is—

1. In changeable-speed gearing for bicycles and the like, the combination with a crank-hanger, terminal ball-bearings, and a crank-axle having a series of longitudinal key-seats, of gear elements of different diameters loosely mounted upon the terminal portions of the crank-axle exterior to the ball-bearings thereof and having key-slots, keys slidable in the key-seats of the crank-axle and confined therein by having their terminal portions embraced by the cones of the aforesaid ball-bearings, said keys having stops near their ends to engage with the said cones to limit the extent of their longitudinal movement in each direction, a band encircling the middle portion of the crank-axle and embracing the said keys medially and confined between spaced lugs thereof, and means for shifting the band to move the keys longitudinally into engagement with either of the gear elements, substantially as described.

2. In changeable-speed gearing for bicycles and the like, the combination with the crank-hanger, terminal ball-bearings, and a crank-axle having a series of longitudinal key-seats, of gear elements of different diameters loosely mounted upon the terminal portions of the crank-axle exterior to the ball-bearings thereof and having arc-shaped key-slots, keys slidable in the key-seats of the crank-axle and confined therein by having their terminal portions embraced by the cones of the ball-bearings, a band encircling the middle portion of the crank-axle and the keys and having positive engagement with the latter, and washers confined upon the terminal portions of the crank-axle and closing the key-slots of the gear elements and holding the parts in fixed relation, substantially as set forth.

3. In changeable-speed gearing for bicycles and the like, a crank-hanger, terminal ball-bearings, a crank-axle provided with opposite longitudinal key-seats and having its end portions stepped or shouldered, independent keys slidable in the key-seats and having their end portions reduced and their middle part provided with outer spaced lugs, the reduced terminal portions of the keys being embraced by the cones of the ball-bearings and the shoulders at their bases limiting the movements of the keys by engagement with the said cones, a band encircling the middle portion of the axle and keys and confined between the said spaced lugs, means for shifting the band, gear elements loosely mounted upon the shouldered portions of the crank-axle and having opposite arc-shaped key-slots, washers closing the outer ends of the arc-shaped key-slots, and cranks secured upon the extreme portions of the crank-axle and confining the parts thereon and maintaining them in fixed relation, substantially as specified.

In testimony that I claim the foregoing as my own I have hereto affixed my signature in the presence of two witnesses.

ELIE VALADE.

Witnesses:
ALEX. P. FRIES,
F. F. MARSHALL.